(12) United States Patent
Giroud et al.

(10) Patent No.: US 9,123,972 B2
(45) Date of Patent: Sep. 1, 2015

(54) IONIC LIQUID ELECTROLYTES COMPRISING AN ANIONIC SURFACTANT AND ELECTROCHEMICAL DEVICES SUCH AS ACCUMULATORS COMPRISING THEM

(75) Inventors: Nelly Giroud, Grenoble (FR); Eric Chainet, Froges (FR); Hélène Rouault, Le Versoud (FR)

(73) Assignees: COMMISSARIAT A L'ENERGIE ATOMIQUE ET AUX ENERGIES ALTERNATIVES (FR); CENTRE NATIONAL DE LA RECHERCHÉ SCIENTIFIQUE (FR)

( * ) Notice: Subject to any disclaimer, the term of this patent is extended or adjusted under 35 U.S.C. 154(b) by 989 days.

(21) Appl. No.: 12/737,417

(22) PCT Filed: Jul. 9, 2009

(86) PCT No.: PCT/EP2009/058775
§ 371 (c)(1),
(2), (4) Date: Mar. 11, 2011

(87) PCT Pub. No.: WO2010/004012
PCT Pub. Date: Jan. 14, 2010

(65) Prior Publication Data
US 2011/0151317 A1    Jun. 23, 2011

(30) Foreign Application Priority Data
Jul. 11, 2008 (FR) ...................... 08 54743

(51) Int. Cl.
*H01M 10/0567* (2010.01)
*H01M 10/0569* (2010.01)
(Continued)

(52) U.S. Cl.
CPC ............ *H01M 10/0567* (2013.01); *H01B 1/122* (2013.01); *H01G 9/038* (2013.01); *H01G 11/06* (2013.01); *H01G 11/64* (2013.01);
(Continued)

(58) Field of Classification Search
None
See application file for complete search history.

(56) References Cited

U.S. PATENT DOCUMENTS 5,869,070 A     2/1999  Dixon et al.
6,495,067 B1 *  12/2002 Ono ........................ 252/299.61
(Continued)

FOREIGN PATENT DOCUMENTS

EP    1775953    4/2007
JP    7059005    3/1995
(Continued)

OTHER PUBLICATIONS

Lee, Yonghee et al: "Reducing IPTV Channel Switching Time using H.264 Scalable Video Coding," IEEE Transactions on Consumer Electronics, vol. 54, Issue 2, Pub. Date. May 2008, pp. 912-919.
(Continued)

*Primary Examiner* — Sarah A Slifka
(74) *Attorney, Agent, or Firm* — Baker Hostetler LLP

(57) ABSTRACT

The invention relates to an ionic liquid electrolyte comprising at least one ionic liquid of formula $C^+A^-$ wherein $C^+$ represents a cation and $A^-$ represents an anion, and at least one conducting salt, characterized in that it further comprises at least one anionic surfactant. The invention also relates to an electrotechnical system, electrochemical accumulator and battery, and in particular, a lithium accumulator such as a button battery cell.

45 Claims, 1 Drawing Sheet

(51) Int. Cl.
*H01M 10/0525* (2010.01)
*H01B 1/12* (2006.01)
*H01G 9/022* (2006.01)
*H01G 11/06* (2013.01)
*H01G 11/64* (2013.01)
*H01M 10/0568* (2010.01)

(52) U.S. Cl.
CPC ...... *H01M10/0569* (2013.01); *H01M 10/0525* (2013.01); *H01M 10/0568* (2013.01); *Y02E 60/13* (2013.01)

(56) References Cited

U.S. PATENT DOCUMENTS

| | | | |
|---|---|---|---|
| 7,470,778 B2 | 12/2008 | von Hagen et al. | |
| 7,864,508 B2 * | 1/2011 | Fukumine | 361/502 |
| 7,919,629 B2 | 4/2011 | Michot | |
| 2007/0026318 A1 * | 2/2007 | Kishi et al. | 429/341 |

FOREIGN PATENT DOCUMENTS

| | | | |
|---|---|---|---|
| JP | 2006-339009 | | 12/2006 |
| JP | 2006-339010 | | 12/2006 |
| JP | 2006339009 | | 12/2006 |
| JP | 2006339010 | | 12/2006 |
| WO | WO2004/114668 | | 12/2004 |
| WO | WO2006/057938 | | 6/2006 |
| WO | WO2006106680 | * | 10/2006 |
| WO | WO2008/061211 | | 5/2008 |

OTHER PUBLICATIONS

Jiang Tang, et al., Temperature dependant self-assembly of surfactant Brij 76 in room temperature ionic liquid, Science Direct, Colloids and Surfaces, Elsevier.

J. Fuller, et al., The room temperature ionic liquid 1-ethyl-3-methylimidazolium . . . , J. Electrochem. Soc., vol. 144, No. 11, Nov. 1997, 3881-3886.

A. Chagnes et al., Imidazolium-organic solvent mixtures as electrolytes for lithium batteries, Journal of Power Sources 145, 2005, 82-88.

E. Markevich, et al., On the possibility of using ionic liquids as electrolyte solutions for rechargeable . . . , Electrochemistry Communications 8, 2006, 1331-1334.

Sang-Young Lee, et al., Two-cation competition in ionic-liquid-modified electrolytes for lithium ion batteries, J. Phys. Chem. B2005, 109, 13663-13667.

* cited by examiner

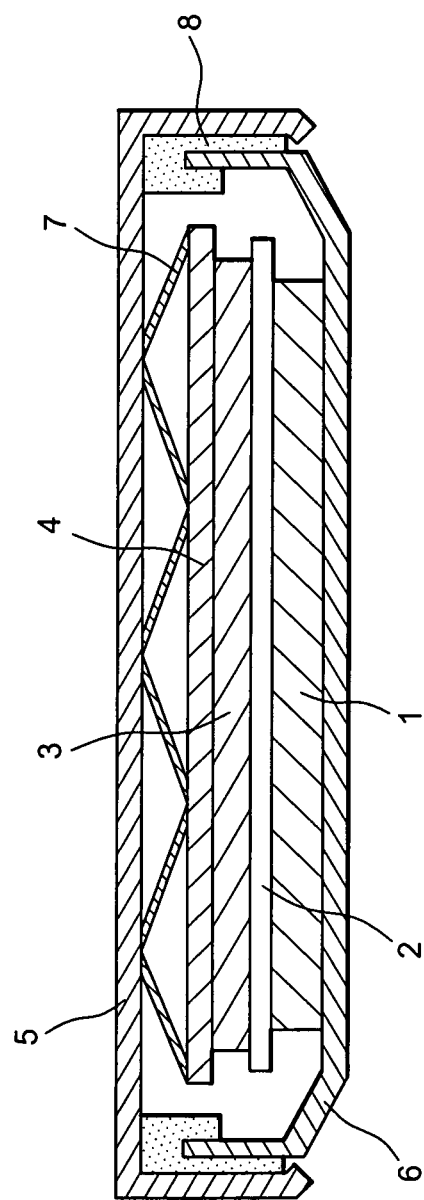

IONIC LIQUID ELECTROLYTES COMPRISING AN ANIONIC SURFACTANT AND ELECTROCHEMICAL DEVICES SUCH AS ACCUMULATORS COMPRISING THEM

TECHNICAL FIELD

The invention relates to a liquid electrolyte, and more particularly to an electrolyte comprising an ionic liquid solvent and a conducting salt, and further an anionic surfactant.

The liquid electrolyte according to the invention may thus be called an ionic liquid electrolyte.

The invention more particularly relates to an electrolyte for rechargeable lithium accumulators (or lithium secondary batteries) comprising an ionic liquid solvent and a lithium salt.

The invention further relates to an electrochemical device or system such as a rechargeable accumulator (or secondary battery), notably a primary lithium accumulator (battery) or a lithium ion accumulator (battery) comprising this electrolyte.

The invention may notably find application in the field of electrochemical storage, accumulators or batteries and in particular lithium accumulators or batteries.

STATE OF THE PRIOR ART

Generally, the technical field of the invention may be defined as that of the formulation of electrolytes, and more specifically as that of the formulation of ionic liquid electrolytes, i.e. solutions comprising a ionic liquid solvent and a solute such as a conducting salt, where ionic conduction mechanisms come into play.

If one is more particularly interested in lithium accumulators or batteries, a lithium accumulator or battery is generally composed of:

two electrodes, i.e. a positive electrode and a negative electrode. The positive electrode generally comprises, as an electrochemically active material, lithium intercalation materials such as lamellar oxides of lithiated transition metals, olivines ($LiFePO_4$) or spinels (for example the spinel $LiNi_{0.5}Mn_{1.5}O_4$). The negative electrode generally comprises, as an electrochemically active material, metal lithium in the case of primary accumulators, batteries, or intercalation materials such as graphite carbon ($C_{gr}$), or lithiated titanium oxide ($Li_4Ti_5O_{12}$) in the case of accumulators, batteries based on lithium-ion technology, current collectors, generally in copper for the negative electrode, or in aluminium for the positive electrode, which allow circulation of electrons, and therefore electron conduction, in the outer circuit, an electrolyte where ion conduction occurs which ensures the passing of the lithium ions from one electrode to another, a separator with which contact and therefore short-circuits may be prevented between the electrodes. These separators may be microporous polymer membranes.

The accumulator or battery may notably have the shape of a button battery cell as described in FIG. 1.

The electrolytes used in present lithium or lithium ion accumulators or batteries are liquid electrolytes consisting of a mixture of organic solvents, most often carbonates, in which a lithium salt is dissolved.

The most current organic solvents are thus carbonates, either cyclic or not, such as ethylene carbonate (EC), propylene carbonate (PC), dimethyl carbonate (DMC), diethyl carbonate (DEC), and vinylene carbonate (VC). Although allowing very good yield, these organic electrolytes pose safety problems. Indeed they are flammable and volatile, which may generate fires and explosions in certain cases. Further, these electrolytes cannot be used at temperatures above 60° C. since, because of their volatility; they may cause swelling of the lithium accumulator and lead to explosion of the latter.

The lithium salts added to the electrolytes are most often selected from the following salts:

$LiPF_6$: lithium hexafluorophosphate,
$LiBF_4$: lithium tetrafluoroborate,
$LiAsF_6$: lithium hexafluoroarsenate,
$LiClO_4$: lithium perchlorate,
LiBOB: lithium bis oxalatoborate,
LiTFSI: lithium bis(trifluoro-methylsulfonyl)imide,
LiBeti: lithium bis(perfluoro-ethylsulfonyl)imide,
LiFSI: lithium bis(fluorosulfonyl)imidide,
or salts of general formula $Li[N(SO_2C_nF_{2n+1})(SO_2C_mF_{2m+1})]$, wherein and m, either identical or different, are natural integers comprised between 1 and 10, preferentially between 1 and 5.

In order to overcome the safety problems and notably the problems of inflammation, and of gas accumulation due to the low thermal stability, to the high vapor pressure and to the low flash point of the organic solvents of these liquid electrolytes, replacing them with ionic liquids was suggested.

Ionic liquids may be defined as liquid salts comprising a cation and an anion. Ionic liquids thus generally consist of a bulky organic cation, giving them a positive charge, with which is associated an inorganic anion which gives them a negative charge. Further, ionic liquids are, as indicated by their name, generally liquid in the range of temperatures from 0° C. to 200° C., notably around room temperature, and they are thus often called <<RTIL>> (or Room Temperature Ionic Liquids).

The diversity of the ionic liquids is such that it is possible to develop a large number of electrolytes. However, there exist families of more interesting ionic liquids. These families are classified according to the type of cation used. Mention may especially be made of the following cations:

di- or tri-substituted imidazolium cation,
quaternary ammonium,
dialkyl piperidinium,
dialkyl pyrrolidinium,
dialkyl pyrazolium,
alkyl pyridinium,
tetra-alkyl phosphonium,
trialkyl sulfonium.

The most often associated anions are anions having a delocalized charge such as $BF_4^-$, $B(CN)_4^-$, $CH_3BF_3^-$, $CH_2CHBF_3^-$, $CF_3BF_3^-$, $m\text{-}C_nF_{2n+1}BF_3^-$, $PF_6^-$, $CF_3CO_2^-$, $CF_3SO_3^-$, $N(SO_2CF_3)_2^-$, $N(COCF_3)(SOCF_3)^-$, $N(CN)_2^-$, $C(CN)_3^-$, $SCN^-$, $SeCN^-$, $CuCl_2^-$, $AlCl_4^-$ etc.

The ionic liquid electrolyte is then composed of a ionic liquid playing the role of a solvent and of a conducting salt such as a lithium salt.

The ionic liquid electrolytes are interesting from the point of view of safety in all salts of electrochemical applications, since they exhibit great thermal stability which may range for example up to 450° C. for mixtures of 1-butyl-3-methylimidazolium tetrafluoroborate, $BMIBF_4$, and $LiBF_4$ they have a large range of liquid phase, they are not flammable, and they have a very low vapor pressure.

Document [1] describes electrolytes comprising 1-ethyl-3-methylimidazolium tetrafluoroborate which is a ionic liquid at room temperature, and ferrocene, tetrathiafulvalene or $LiBF_4$.

It is possible to combine in the electrolyte, a conventional liquid organic solvent and a ionic liquid as described in document [2], which relates to an electrolyte for a lithium ion battery which comprises a mixture of 1-butyl-3-methylimidazolium tetrafluoroborate which is a ionic liquid at room temperature, of gamma-butyrolactone, and of lithium tetrafluoroborate.

The document [3] mentions the use of electrolytes based on 1-butyl-3-methylimidazolium tetrafluoroborate (BMIBF4) and of 1-ethyl-3-methylimidazolium tetrafluoroborate (EMIBF4) in lithium ion batteries with spinel electrodes.

However, complex phenomena which are at the origin of a certain number of problems and drawbacks occur within electrolytes comprising a mixture of ionic liquids and conducting salts such as lithium salts.

Thus when the lithium salt concentration increases, this is a accompanied by a lowering of the ionic conductivity and an increase in the viscosity. Further, the diffusion coefficients of lithium in these mixtures decrease for increasing lithium salt content. In fact, structuration of the mixture occurs which reduces the mobility of lithium ions.

The diffusion coefficient of lithium in these electrolytes is less than that of the cation making up the ionic liquid. Therefore there exists a competition between lithium cations and the cations of the ionic liquid. The cations of the ionic liquid arrive more rapidly at the surface of the negatively charged electrode, and block the access of the surface to the lithium ions which cannot be inserted into the intercalation material of the electrode. The electrochemical reaction therefore cannot occur. The performances of the battery using the electrolyte are therefore affected. This phenomenon is discussed in document [6].

Therefore, considering the foregoing, there exists a need for an ionic liquid electrolyte, i.e. an electrolyte comprising a ionic liquid playing the role of a solvent and a conducting salt such as a lithium salt, which when it is applied, used, in an electrochemical system, does not negatively affect the electrochemical reaction and its yield.

In particular there exists a need for an ionic liquid electrolyte, which, when it is used in an accumulator or battery, such as a rechargeable lithium accumulator or lithium secondary battery, does not deteriorate its capacity.

In other words, there exists a need for an ionic liquid electrolyte, which, while having all the advantages of ionic liquid electrolytes notably in terms of safety of use, does not have the drawbacks thereof as regards the mobility of the ions such as lithium ions, the diffusion coefficient of the ions such as lithium ions, and therefore the insufficient performances of the accumulator.

SUMMARY OF THE INVENTION

The goal of the present invention is to provide a ionic liquid electrolyte comprising a ionic liquid and a conducting salt, which i.a. meets the needs listed above.

The goal of the present invention is still to provide a ionic liquid electrolyte which does not have the drawbacks, defects, limitations and disadvantages of the ionic liquid electrolytes of the prior art and which solves the problem of the prior art.

This goal, and still other ones are achieved according to the invention by a ionic liquid electrolyte comprising at least one ionic liquid of formula $C^+A^-$ wherein $C^+$ represents a cation and $A^-$ represents an anion, and at least one conducting salt, characterized in that it further comprises at least one anionic surfactant.

The anionic surfactant may be selected from alkyl and alkylaryl sulfates; soaps such as sodium salts of fatty acids; alkylbenzene sulfonates (ABS); alcohol sulfates; alkyl sulfate alcohols; phosphates; cellulose gums such as sodium carboxymethylcellulose; and mixtures thereof. It should be understood that an anionic surfactant may be selected from the above list of chemicals but is not to be construed to mean that all compounds within each chemical category in the above list are ionic surfactants.

Preferred anionic surfactants are selected from alkyl sulfates such sodium dodecylsulfate (SDS), sodium carboxymethylcellulose, and sodium stearate.

The ionic liquid electrolyte according to the invention may only comprise at least one anionic surfactant but it may further comprise at least one other surfactant which is not an anionic surfactant selected from cationic surfactants, non-ionic surfactants and zwitterionic surfactants.

The non-ionic surfactant may be selected from (poly)ethoxylated and/or (poly)propoxylated alcohols and (especially $C_8$-$C_9$) alkylphenols, polyol esters, saccharose esters, fatty alkanolamides, ethylene oxide/propylene oxide copolymers and mixtures thereof.

The preferred non-ionic surfactants are selected from Triton® X and Triton® X-100, (both registered as trademarks of Dow Chemical), which correspond to octyphenol ethoxytlates, Tergitol® L, (registered trademark of Dow Chemical), which corresponds to ethylene oxide/propylene copolymers and Tergitol® NP (registered trademark of Dow Chemical) which correspond to nonylphenol ethoxylates. All of these trademark chemicals are identified by Dow Chemical in the registeration as nonionic surfactants.

The ionic liquid electrolyte according to the invention has never been described in the prior art.

The ionic liquid electrolyte according to the invention is fundamentally distinguished from ionic liquid electrolytes of the prior art in that it comprises an anionic surfactant or tenside, surface active agent.

Tensides are certainly often used in elaborating electrodes of accumulators, batteries, but the use of tensides, specifically anionic tensides, in liquid electrolytes, let alone in ionic liquid electrolytes have never been described or suggested. The electrodes consist of materials totally different from ionic electrolytes and the problems which are posed in the electrodes have nothing in common with the problems which are posed in electrolytes notably in ionic liquid electrolytes.

Surprisingly, it was found that adding an anionic surfactant or tenside in a ionic liquid electrolyte notably led to a surprising increase in the mobility of the cation of the conducting salt such as the lithium cation, as well as of the diffusion coefficient of this cation, as compared with the same ionic liquid electrolyte not comprising any anionic tenside.

The performances of an electrochemical system, for example of an accumulator, using the electrolyte according to the invention, are improved, in particular in terms of practical capacity when they are compared with the performances of an electrochemical system, for example of an accumulator, battery, using an analogous electrolyte but without any anionic tenside.

The electrolyte according to the invention does not have the drawbacks of the ionic liquid electrolytes of the prior art notably as regards degradation of the performances of the electrochemical devices such as accumulators, batteries, using these electrolytes.

The electrolyte according to the invention provides a solution to the problems which were encountered in ionic liquid electrolytes of the prior art while always having the advantages inherent to electrolytes, the solvent of which is an ionic liquid, as regards safety, non-flammability, and low vapor pressure etc.

Advantageously, the cation $C^+$ of the ionic liquid is selected from organic cations.

Thus, the cation $C^+$ of the ionic liquid may be selected from hydroxonium, oxonium, ammonium, amidinium, phosphonium, uronium, thiouronium, guanidinium, sulfonium, phospholium, phosphorolium, iodonium, carbonium cations; heterocyclic cations such as pyridinium, quinolinium, isoquinolinium, imidazolium, pyrazolium, imidazolinium, triazolium, pyridazinium, pyrimidinium, pyrrolidinium, thiazolium, oxazolium, pyrazinium, piperazinium, piperidinium, pyrrolium, pyrizinium, indolium, quinoxalinium, thiomorpholinium, morpholinium, and indolinium cations; and the tautomeric forms thereof.

Advantageously, the cation $C^+$ of the ionic liquid is selected from unsubstituted or substituted imidazoliums such as les di-, tri-, tetra- and penta-alkyl imidazoliums, quaternary ammoniums, unsubstituted or substituted piperidiniums such as dialkylpiperidiniums, unsubstituted or substituted pyrrolidiniums such as dialkylpyrrolidiniums, unsubstituted or substituted pyrazoliums such as dialkylpyrazoliums, unsubstituted or substituted pyridiniums such as alkylpyridiniums, phosphoniums such as tetraalkylphosphoniums, sulfoniums such as trialkylsulfoniums, and the tautomeric forms of the latter.

Preferably the cation $C^+$ of the ionic liquid is selected from piperidiniums such as dialkylpiperidiniums; quaternary ammoniums such as quaternary ammoniums bearing four alkyl groups; imidazoliums such as di-, tri-, tetra- and penta-substituted imidazoliums such as di-, tri-, tetra-, and penta-alkyl imidazoliums; and the tautomeric forms of the latter.

The anion $A^-$ of the ionic liquid may be selected from halides such as $Cl^-$, $BF_4^-$, $B(CN)_4^-$, $CH_3BF_3^-$, $CH_2CHBF_3^-$, $CF_3BF_3^-$, $m\text{-}C_nF_{2n+1}BF_3^-$ wherein n is an integer such that $1 \leq n \leq 10$, $PF_6^-$, $CF_3CO_2^-$, $CF_3SO_3^-$, $N(SO_2CF_3)_2^-$, $N(COCF_3)(SOCF_3)^-$, $N(CN)_2^-$, $C(CN)_3^-$, $SCN^-$, $SeCN^-$, $CuCl_2^-$, and $AlCl_4^-$.

The anion $A^-$ of the ionic liquid is preferably selected from $BF_4^-$ and $TFSI\text{-}(N(SO_2CF_3)_2^-)$.

A preferred ionic liquid comprises a cation $C^+$ selected from piperidiniums, quaternary ammoniums and imidazoliums, associated with an anion selected from $BF_4^-$ and $TFSI\text{-}(N(SO_2CF_3)_2^-)$.

A particularly preferred ionic liquid is $BMIBF_4$ or 1-butyl-3-methylimidazolium tetrafluoroborate.

Advantageously, the conducting salt is selected from lithium salts.

Thus, the conducting salt may be selected from $LiPF_6$: lithium hexafluorophosphate, $LiBF_4$: lithium tetrafluoroborate, $LiAsF_6$: lithiumi hexafluoroarsenate, $LiClO_4$: lithium perchlorate, LiBOB: lithium bis oxalatoborate, LiFSI: lithium bis (fluorosulfonyl) imidide, salts of general formula $Li(N(SO_2C_nF_{2n+1})(SO_2C_mF_{2m+1}))$ wherein n and m, either identical or different, are natural integers comprised between 1 and 10 such as LiTFSI: lithium bis(trifluoromethylsulfonyl) imidide or $LiN(CF_3SO_2)_2$, or LiBeti: lithium bis(perfluoroethylsulfonyl)imidide, LiODBF, $LiB(C_6H_5)$, $LiCF_3SO_3$, $LiC(CF_3SO_2)_3$ (LiTFSM), and mixtures thereof.

Preferably, the conducting salt is selected from LiTFSI, $LiPF_6$, LiFSI, $LiBF_4$, and mixtures thereof.

The electrolyte according to the invention may comprise from 0.001 to 0.5 moles of anionic surfactant per mole of ionic liquid solvent, preferentially around 0.1 mole.

Advantageously, the electrolyte according to the invention may comprise from 0.1 to 10 mol/L of conducting salt.

The electrolyte according to the invention may further comprise at least one organic salt such as those traditionally used by man skilled in the art of electrolytes. The optional organic solvent notably allows lowering of the viscosity of the electrolyte.

But the electrolyte according to the invention may only be composed of the ionic electrolyte(s), the conducting salt(s), and the surfactant(s).

A particularly preferred ionic liquid electrolyte according to the invention comprises 1.6 mol/L of $LiPF_6$ in an equimolar mixture of ionic liquid solvent $BMIBF_4$ and SDS.

The invention also relates to an electrochemical device or system which comprises a ionic liquid electrolyte as described above.

This electrochemical system may in particular be a rechargeable electrochemical accumulator (or secondary electrochemical battery) such as a lithium accumulator (or battery) comprising the ionic liquid electrolyte as described above, a positive electrode, and a negative electrode.

The accumulator (or battery) may notably have the shape of a button battery cell.

The invention will now be described more specifically in the description which follows, given as an illustration and not as a limitation, with reference to the appended drawings wherein:

FIG. 1 is a schematic vertical sectional view of an accumulator, battery, in the form of a button battery cell comprising an electrolyte, for example an electrolyte to be tested, according to the invention, such as the electrolyte prepared in Example 1 or in Example 2.

This description generally more particularly refers to an embodiment wherein the ionic liquid electrolyte is the ionic liquid electrolyte of a rechargeable lithium accumulator (lithium secondary battery), but it is quite obvious that the description which follows may easily be extended, if necessary to any ionic liquid electrolyte which may be used in any electrochemical device or system.

The ionic liquid electrolyte according to the invention comprises at least one ionic liquid, playing the role of a solvent, of formula $C^+A^-$ wherein $C^+$ represents a cation and $A^-$ represents an anion, at least one conducting salt, and further at least one anionic surfactant.

By at least one ionic liquid is meant that the electrolyte according to the invention may comprise a single ionic liquid or it may comprise several of these ionic liquids which may for example differ by the nature of the cation and/or of the anion making it up.

Also, by at least one conducting salt and at least one anionic surfactant is meant that the electrolyte according to the invention may respectively comprise one single or several conducting salt(s) and one single or several anionic surfactant(s).

The ionic liquid of the electrolyte according to the invention plays the role of a solvent for the conducting salt. By <<liquid>> is generally meant that the ionic liquid solvent is liquid in a temperatures range from 0 to 200° C., and that it is notably liquid in the vicinity of the room temperature, i.e. from 15 to 30° C., preferably from 20 to 25° C.

There is no limitation as to the selection for the cation $C^+$ of the ionic liquid.

Preferably, the cation $C^+$ is selected from organic cations, notably <<bulky>> organic cations, i.e. cations including groups known to the man skilled in the art in organic chemistry for having significant steric hindrance.

Thus, the cation $C^+$ of the ionic liquid may be selected from hydroxonium, oxonium, ammonium, amidinium, phosphonium, uronium, thiouronium, guanidinium, sulfonium, phospholium, phosphorolium, iodonium, carbonium cations; heterocyclic cations, and the tautomeric forms of these cations.

By heterocyclic cations are meant cations derived from heterocycles, i.e. cycles comprising one or more (several) heteroatom(s) generally selected from N, O, P, and S.

These heterocycles may be saturated, unsaturated, or aromatic, and they may further be fused with one or more other heterocycles and/or one or more other saturated, unsaturated or aromatic carbon cycles.

In other words, these heterocycles may be monocyclic or polycyclic.

These heterocycles may further be substituted with one or more substituents, preferably selected from linear or branched alkyl groups with 1 to 20 carbon atoms such as the methyl, ethyl, n-propyl, i-propyl, n-butyl, i-butyl, and t-butyl groups; cycloalkyl groups with 3 to 7 C atoms; linear or branched alkenyl groups with 1 to 20 carbon atoms; linear or branched alkynyl groups with 1 to 20 carbon atoms; aryl groups with 6 to 10 carbon atoms such as the phenyl group; alkyl(1 to 20 C atoms)-aryl(6 to 10 C atoms) groups such as the benzyl group.

The heterocyclic cations may be selected from pyridinium, quinolinium, isoquinolinium, imidazolium, pyrazolium, imidazolinium, triazolium, pyridazinium, pyrimidinium, pyrrolidinium, thiazolium, oxazolium, pyrazinium, piperazinium, piperidinium, pyrrolium, pyrizinium, indolium, quinoxalinium, thiomorpholinium, morpholinium, and indolinium cations.

These cations may optionally be substituted as defined above.

The heterocyclic cations also include the tautomeric forms of the latter.

Examples of heterocyclic cations which may form the cation $C^+$ of the ionic liquid solvent of the electrolyte according to the invention are given below:

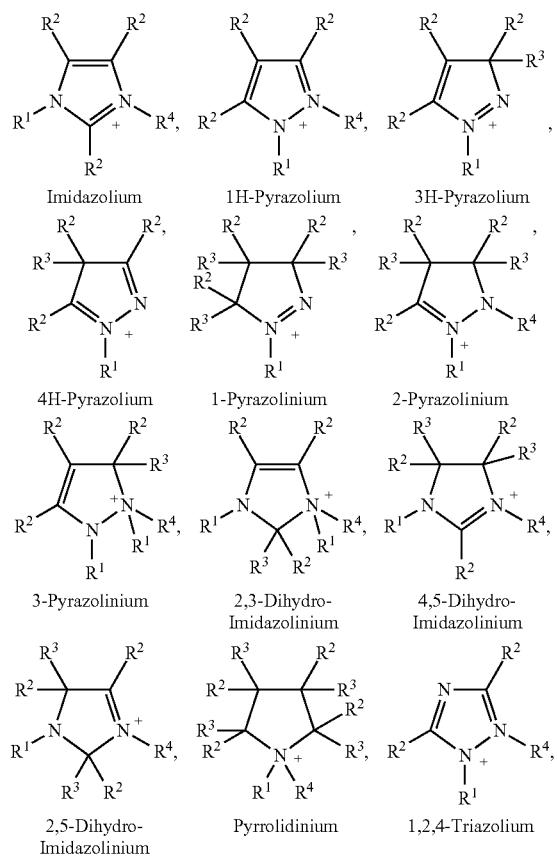
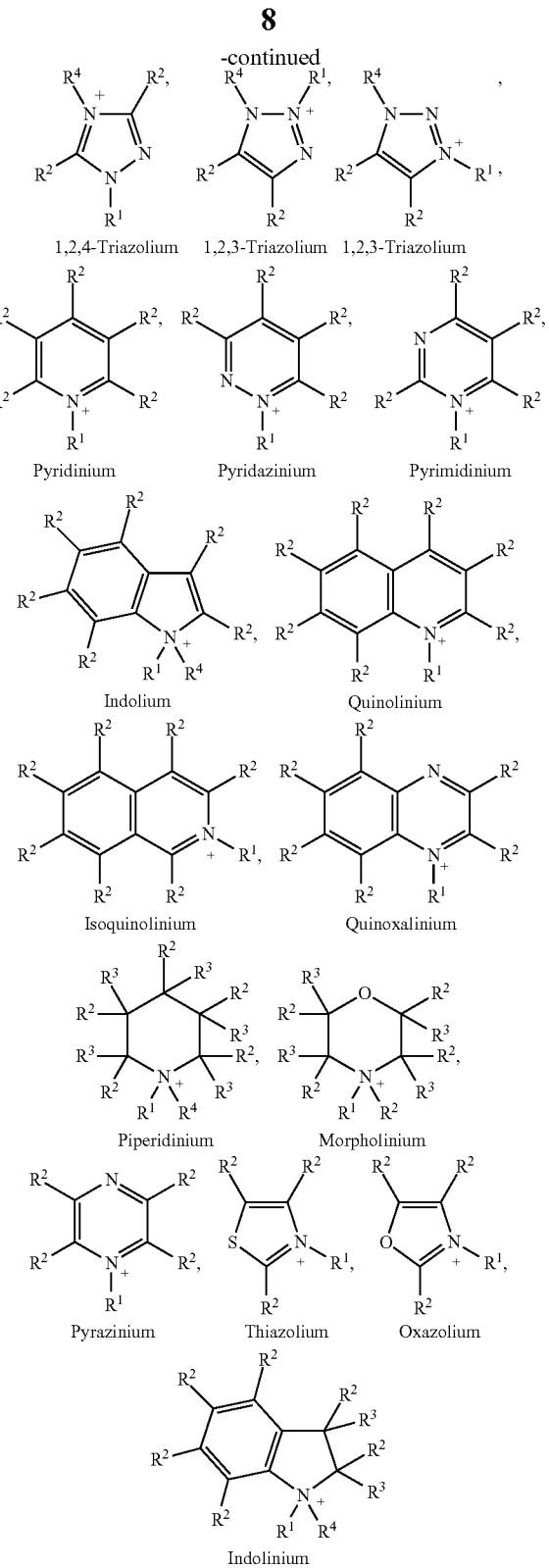

In these formulae, the $R^1$, $R^2$, $R^3$ and $R^4$ groups independently of each other represent a hydrogen atom or a substituent preferably selected from the groups already listed above, notably linear or branched alkyl groups with 1 to 20 C atoms.

The diversity of ionic liquids is such that it is possible to prepare a large number of electrolytes. However, families of ionic liquids are more interesting, notably for the applications more particularly targeted herein. These families of ionic liquids are defined by the type of C⁺ cation that is used.

Thus preferably, the $C^+$ cation of the ionic liquid of the electrolyte according to the invention will be selected from unsubstituted or substituted imidazoliums such as di-, tri-, tetra- and penta-alkyl imidazoliums, quaternary ammoniums, unsubstituted or substituted piperidiniums such as dialkylpiperidiniums, unsubstituted or substituted pyrrolidiniums such as dialkylpyrrolidiniums, unsubstituted or substituted pyrazoliums, dialkylpyrazoliums, unsubstituted or substituted pyridiniums such as alkylpyridiniums, phosphoniums, tetraalkylphosphoniums, and sulfoniums such as trialkylsulfoniums.

Preferably the $C^+$ cation of the ionic liquid is selected from piperidiniums such as dialkylpiperidiniums, quaternary ammoniums such as quaternary ammoniums bearing four alkyl groups, and imidazoliums such as di-, tri-, tetra-, and penta-substituted imidazoliums like di-, tri-, tetra- and penta-alkyl imidazoliums.

As already specified above, the alkyl groups have from 1 to 20 C atoms and may be linear or branched.

Among these cations, dialkylpiperidiniums, quaternary ammoniums bearing four alkyl groups, and di-, tri-, tetra- and penta-alkyl imidazoliums are especially preferred. However, as regards imidazolium cations, di- and tri-substituted imidazoliums have better physico-chemical and electrochemical properties and are therefore still more preferred.

These preferred cations were selected because the imidazolium cation has the largest ion conductivities as well as the lowest viscosity. The piperidinium cation itself exhibits very high electrochemical stability and average ion conductivity and viscosity. Finally, quaternary ammoniums are very stable electrochemically but have very low ion conductivities.

Also there is no limitation as to the choice of the anion $A^-$ of the ionic liquid.

Preferably the anion $A^-$ of the ionic liquid is selected from halides such as $Cl^-$, $BF_4^-$, $B(CN)_4^-$, $CH_3BF_3^-$, $CH_2CHBF_3^-$, $CF_3BF_3^-$, $m\text{-}C_nF_{2n+1}BF_3^-$ (wherein n is an integer such that $1 \leq n \leq 10$), $PF_6^-$, $CF_3CO_2^-$, $CF_3SO_3^-$, $N(SO_2CF_3)_2^-$, $N(COCF_3)(SOCF_3)^-$, $N(CN)_2^-$, $C(CN)_3^-$, $SCN^-$, $SeCN^-$, $CuCl_2^-$, and $AlCl_4^-$.

More preferred anions are the anions $BF_4^-$ and TFSI-($N(SO_2CF_3)_2^-$).

These anions actually allow an increase in the ion conductivity and a decrease in the viscosity. Further the anion $TFSI^-$ is slightly more stable at a high potential. It is quite obvious that other anions may however be selected.

A more preferred ionic liquid for the ionic liquid electrolyte according to the invention comprises as an anion, an anion $BF_4^-$ or TFSI-($N(SO_2CF_3)_2^-$) and as a cation, a piperidinium, quaternary ammonium or imidazolium cation. The association of such an anion and of such a cation imparts to the ionic liquid electrolyte extremely advantageous properties.

An exemplary ionic liquid particularly well suited to a use in the ionic liquid electrolyte according to the invention is $BMIBF_4$ or 1-butyl-3-methylimidazolium tetrafluoroborate.

Other examples of ionic liquids are given in documents [4] and [5], to the description of which reference may be made.

There exists no limitation as to the choice of the conducting salt of the ionic liquid electrolyte according to the invention.

The conducting salt is preferably a lithium salt, notably in the case when the ionic liquid electrolyte according to the invention is the electrolyte of a rechargeable lithium or lithium-ion accumulator (lithium or lithium ion secondary battery).

This lithium salt may be selected from $LiPF_6$: lithium hexafluorophosphate, $LiBF_4$: lithium tetrafluoroborate, $LiAsF_6$: lithium hexafluoroarsenate, $LiClO_4$: lithium perchlorate, LiBOB: lithium bis oxalatoborate, LiFSI: lithium bis (fluorosulfonyl)imidide, salts of general formula Li[$N(SO_2C_nF_{2n+1})(SO_2C_mF_{2m+1})$] wherein n and m either identical or different are natural integers comprised between 1 and 10, such as LiTFSI: lithium bis(trifluoro-methylsulfonyl)imidide ou $LiN(CF_3SO_2)_2$, or LiBeti: lithium bis(perfluoroethylsulfonyl)imidide, LiODBF, $LiB(C_6H_5)$, $LiCF_3SO_3$, $LiC(CF_3SO_2)_3$ (LiTFSM), and mixtures thereof.

The lithium salts to be added into the ionic liquids are preferentially in the order:
1$^{st}$: LiTFSI,
2$^{nd}$: LiPF$_6$,
3$^{rd}$: LiFSI,
4$^{th}$: LiBF$_4$.

Indeed the best ion conductivities are obtained for these salts, and further with LiTFSI the viscosity is the lowest.

The total concentration of the conducting salt(s) in the ionic liquids may be comprised between 0.1 mol/l per liter of ionic liquid solvent right up their solubility limit in the selected ionic liquid solvent, preferably it is from 0.1 to 10 mol/l.

The anionic surfactant may be considered as the essential fundamental constituent of the electrolyte according to the invention since it is this constituent which differentiates the electrolyte according to the invention from the electrolytes of the prior art and it is this surfactant which is at the origin of the surprising and advantageous properties of the electrolyte according to the invention.

Let us first of all recall that a surfactant, also called a dispersant, wetting agent, or tenside is a chemical having amphiphilic properties i.e. it has two portions of different polarities:
an a polar lipophilic portion which retains the 'fatty' materials (having a carbon chain),
a polar hydrophilic portion.

Generally, these dispersing agents give the possibility of fixing the hydrophobic (or lipophilic) particles contained in a hydrophilic solution such as water which allows creation of a dispersion. Further they give the possibility of reducing surface interactions since they lower the free energy.

There exist four types of surfactants or tensides:
anionic tensides wherein the hydrophilic polar portion of the molecule is negatively charged,
cationic tensides wherein the hydrophilic portion is positively charged,
zwitterionic or amphoteric tensides which include a positive and a negative charge, the global charge of the polar portion is zero,
non-ionic tensides wherein the molecule does not include a net charge.

The surfactant, tenside, used in the ionic liquid electrolyte according to the invention is an anionic tenside.

However, the ionic liquid electrolyte according to the invention may in addition to one or more (several) anionic surfactant(s), further comprise one or more surfactant(s) which is(are) not anionic surfactant(s) and which is(are) selected from cationic, non-ionic and zwitterionic surfactants.

Ionic liquids are particular solvents wherein a large number of intra- and inter-molecular interactions take place for example: coulombic (electrostatic) interactions, dipole-dipole interactions, hydrogen bonds, Van Der Waals forces etc. and the inventors have shown that by adding an anionic surfactant to a ionic liquid electrolyte comprising a ionic liquid solvent, it is possible, without any intention of being bound to any theory, to accomplish two actions:

A first action is to reduce steric hindrance of the complex structure around the cation of the conducting salt, such as the lithium ion, and so to thereby increase the mobility of this cation such as the lithium cation.

A second action is to trap the cation of the ionic liquid by associating it with a bulky negatively charged molecule with which it combines by means of coulombic interactions thereby causing the reduction of its diffusion coefficient and therefore of its mobility in the medium.

The mode of action of the anionic surfactants and of the optional non-ionic surfactants is specified below.

The anionic surfactant may be selected from alkyl sulfates and alkyl aryl sulfates; soaps such as sodium salts of fatty acids; alkylbenzene sulfonates (ABS); alcohol sulfates, alcohol alkyl sulfates; phosphates; cellulose gums such as sodium carboxymethylcellulose; and mixtures thereof. Preferably, it is selected from alkyl sulfates, the alkyl group of which generally comprises from 1 to 20 carbon atoms, such as sodium dodecylsulfate (SDS) also called sodium laurylsulfate (formula I below) of chemical formula $NaC_{12}H_{25}SO_4$; and sodium carboxymethylcellulose (formula II below).

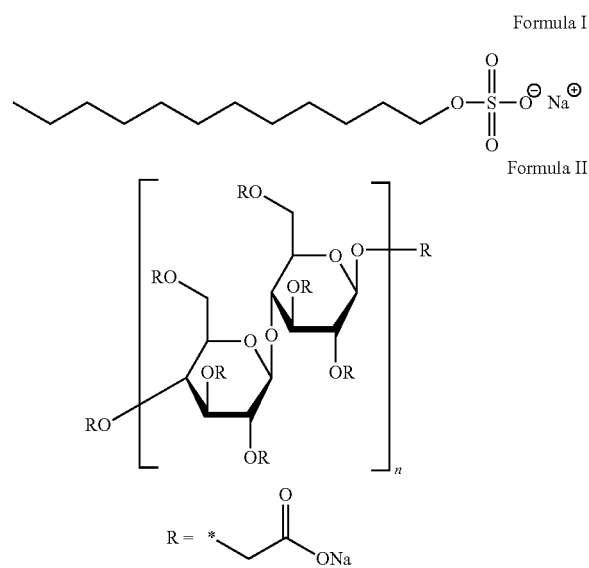

Formula I

Formula II

The optional non-ionic surfactant may be selected from (poly)ethoxylated and/or (poly)propoxylated alcohols and (especially $C_8$-$C_9$) alkylphenols, polyol esters, saccharose esters, fatty alkanolamides, ethylene oxide/propylene oxide copolymers, and mixtures thereof.

The preferred optional non-ionic surfactants are selected from TRITON® X such as Triton® X-100, the formula of which is given below, which are polyethoxylated octylphenols, Tergitol® L (DOW) which are ethylene oxide/propylene oxide copolymers also called "polyether polyols", and Tergitol® NP (DOW) which belong to the family of polyethoxylated alkylphenols, more specifically polyethoxylated nonylphenols, and which are also called "ethoxylated nonylphenols".

Triton® X-100 fits the formula III below wherein n represents 9 or 10. Triton® X-100 is notably available from Sigma Aldrich®.

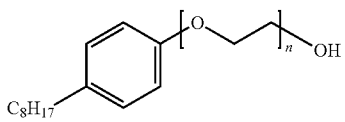

Formula III

The electrolyte according to the invention generally comprises from 0.001 to 0.5 mole of anionic surfactant per mole of ionic liquid solvent.

Thus, the number of moles of surfactant to be added may be half less than the number of moles of the ionic liquid solvent. However smaller amounts for example from 0.01 to 0.1 may be added.

By adding an anionic surfactant to a ionic liquid electrolyte, the number of charge carriers within the ionic liquid electrolyte will increase, which may be a nuisance for the competition between the different ions in the solution. However the anionic surfactant is generally composed of a bulky anionic molecule associated with a small cation. Coulombic interactions will occur between the cation of the ionic liquid and the anion of the surfactant causing their association. There will be therefore creation of ion pairs between the cation of the ionic liquid and the anion of the surfactant which will have the consequence of slowing down, trapping the cation of the ionic liquid, which initially has greater mobility than that of the cation of the conducting salt such as the lithium cation.

The cation of the ionic liquid will then diffuse into the medium less rapidly. It will no longer clog up the surface of the negatively charged electrode towards which the lithium cation does not diffuse and into which it has to be inserted for ensuring that the current flows through. The competition between both cations is therefore reduced.

By optionally adding a non-ionic surfactant in a mixture of ionic liquids and of a solute such as a lithium salt micelles may be formed which limit the solvating power of the ionic liquid. Thus the ion such as the lithium ion dissolved in the ionic liquid has its solvation layer reduced by the addition of the surfactant. Practically, the number of molecules of solvent, i.e. the number of anions and cations of the ionic liquid, around the cation such as the lithium cation is smaller, therefore reducing its steric hindrance. The mobility of the cation such as the lithium cation, will increase as well as its diffusion coefficient, and the performances of the device, electrochemical system containing the ionic liquid electrolyte, such as an accumulator, battery, will be improved in terms of practical capacity.

Further, as the actual volume occupied by lithium and its solvation sphere is smaller, insertion into the electrode materials is then facilitated and electron exchange in the electrode is faster.

Moreover the larger the solvation layer around the cation such as the lithium cation, the greater are the risks of deteriorating the electrodes materials during its insertion, then reducing the efficiency of the electrode and therefore the performances of the accumulator. Accordingly, reducing the solvation layer minimizes the risk of deterioration of the structure of the electrode.

Finally, the anionic surfactant and the optional non-ionic surfactant will act on the passivation layer of the negative electrode. This layer in the presence of the surfactant will be thinner and more homogeneous, limiting the formation of dendrites and therefore reducing the risk of short-circuits.

Further it was noticed that adding an anionic surfactant, such as sodium dodecyl sulfate (SDS), to a ionic liquid electrolyte generally has the consequence of reducing ion conductivity in the ionic liquid electrolyte.

This reduction in ion conductivity may seem to be a penalty. However in spite of this reduction and surprisingly, the cycling performances of the accumulator, battery, containing the liquid electrolyte with an anionic surfactant are increased, and the practical capacity of the accumulator, battery, is better.

In practice, a 5% capacity increase was observed over the first cycles for the electrolyte with an anionic surfactant additive; further there is less irreversible capacity in the first cycle, as compared with a system without any surfactant.

Moreover, adding an anionic surfactant such as SDS, is accompanied by a structuration of the electrolyte and by an increase in its viscosity.

Indeed, a ionic liquid electrolyte gel forms. This proves that there exist interactions in the volume of the electrolyte.

To summarize, it may be stated that the ionic electrolyte according to the invention notably has the following advantages:
  with the ionic liquid electrolyte having an anionic surfactant as an additive, it is possible to increase the practical capacity of the accumulator as compared with an accumulator containing a ionic liquid electrolyte without any anionic surfactant additive.
  The electrolyte according to the invention allows a reduction in the solvation of non-organic ions in the solution.
  The electrolyte promotes insertion of lithium in the intercalation materials.
  The electrolyte according to the invention is stable at high temperature and may therefore be used at temperatures well above 60° C.
  The electrolyte promotes diffusion of the lithium cation.
  The electrolyte according to the invention may only contain the ionic liquid(s), the conducting salt(s) and the surfactant(s), in other words, the electrolyte according to the invention may be composed of (may consist in) the ionic liquid(s), the conducting salt(s), the anionic surfactant(s), and the optional other(s) (non-anionic) surfactant(s).
  The electrolyte according to the invention may further contain other components such as organic solvents. For example, the ionic liquid electrolyte according to the invention may further comprise one or more <<standard>>, conventional, organic solvents (i.e.
    solvents which are not ionic liquids) such as solvents currently used in electrolytes such as carbonates, in a proportion from 5 to 20% by mass of the mass of the electrolyte, notably for lowering the viscosity of the electrolyte.

The ionic liquid electrolyte described above may be used in any electrochemical system using an electrolyte.

This electrochemical system may notably be a rechargeable electrochemical accumulator (secondary electrochemical battery) with a non-aqueous electrolyte such a lithium accumulator or battery, which in addition to the ionic liquid electrolyte as defined above comprises a positive electrode and a negative electrode.

The electrodes comprise a binder which is generally an organic polymer, a positive or negative electrode electrochemically active material, optionally one or more electron-conducting additives, and a current collector.

In the positive electrode, the electrochemically active material may be selected from the compounds already mentioned above in the present description; and from $LiCoO_2$; the compounds derived from $LiCoO_2$ obtained by substitution preferably with Al, Ti, Mg, Ni and Mn, for example $LiAl_x Ni_y Co_{(1-x-y)} O_2$ wherein x<0.5 and y<1, $LiNi_x Mn_x Co_{1-2x} O_2$; $LiMn_2 O_4$; $LiNiO_2$; the compounds derived from $LiMn_2 O_4$ obtained by substitution preferably with Al, Ni and Co; $LiMnO_2$; the compounds derived from $LiMnO_2$ obtained by substitution preferably with Al, Ni, Co, Fe, Cr and Cu, for example $LiNi_{0.5} O_2$; olivines $LiFePO_4, Li_2 FeSiO_4, LiMnPO_4, LiCoPO_4$; iron phosphates and sulfates either hydrated or not; $LiFe_2(PO_4)_3$; vanadyl phosphates and sulfates either hydrated or not, for example $VOSO_4$ and $Li_x VOPO_4$; $nH_2O$ (0<x<3, 0<n<2); $Li_{(1+x)} V_3 O_8$, 0<x<4; $Li_x V_2 O_5$, $nH_2O$, with 0<x<3 and 0<n<2; and mixtures thereof.

In the negative electrode, the electrochemically active material may be selected from the compounds already mentioned above in the present description; and from carbonaceous compounds such as natural or synthetic graphites and disordered carbons; lithium alloys of the type $Li_x M$ with M=Sn, Sb, Si; $Li_x Cu_6 Sn_5$ compounds with 0<x<13; iron borates; reversibly decomposable simple oxides, for example CoO, $Co_2 O_3$, $Fe_2 O_3$; pnicures, for example $Li_{(3-x-y)} Co_y N$, $Li_{(3-x-y)} Fe_y N$, $Li_x MnP_4$, $Li_x FeP_2$; $Li_x FeSb_2$; and insertion oxides such as titanates for example $TiO_2$, $Li_4 Ti_5 O_{12}$, $Li_x NiP_2$, $Li_x NiP_3$, $MoO_3$ and $WO_3$ and mixtures thereof, or any material known to the man skilled in the art in this technical field.

The optional electron-conducting additive may be chosen from metal particles such as Ag particles, graphite, carbon black, carbon fibres, carbon nanowires, carbon nanotubes and electron-conducting polymers, and mixtures thereof.

The current collectors are generally in copper for the negative electrode or in aluminium for the positive electrode.

The accumulator may notably have the shape of a button battery cell.

The different elements of a button battery cell, in stainless steel 316L, are described in FIG. 1.

These elements are the following:
  The upper (5) and lower (6) portions of the stainless steel casing,
  the polypropylene gasket (8),
  the stainless steel shims, skids (4), which are used both optionally for cutting metal lithium and then subsequently for ensuring good contact of the current collectors with the external portions of the battery cell,
  a spring (7), which ensures contact between all the elements,
  a microporous separator (2),
  electrodes (1) (3).

The invention will now be described with reference to the following example, given as an illustration and not as a limitation.

EXAMPLE

An electrolyte according to the invention comprising a ionic liquid, a lithium salt and an anionic surfactant is prepared.

The ionic liquid is $BMIBF_4$ or 1-butyl-3-methylimidazolium tetrafluoroborate.

The lithium salt is $LiPF_6$, or lithium hexafluorophosphate.

The surfactant is sodium dodecyl sulfate or SDS.

The electrolyte is formulated by dissolving 1.6 mol/l of $LiPF_6$ in an equimolar mixture of ionic liquid solvent $BMIBF_4$ and of SDS.

The electrolyte as prepared above in the example was then tested in a button battery cell.

The same electrolyte without any anionic surfactant was tested under the same conditions.

Each button battery cell is mounted while scrupulously observing the same procedure. The following items are thereby stacked from the bottom of the casing of the cell as this is shown in FIG. 1:

- a negative electrode (1) Ø 14 mm, for these tests this is an electrode, the active material of which is $Li_4Ti_5O_{12}$, but any other negative electrode active material notably selected among standard, conventional, active material used in the art for a negative electrode in a non-aqueous medium could be used;
- 200 µl of electrolyte as prepared in the example or else the electrolyte without any anionic surfactant;
- a separator which is a microporous membrane in polyolefin, more specifically a microporous membrane in polypropylene Celgard° (2) Ø 16.5 mm;
- a positive electrode, the active material of which is $LiNi_{0.5}Mn_{1.5}O_4$, but a disc of lithium or of any other type of positive electrode active material notably selected among standard, conventional, active materials used in the art for a positive electrode in a non-aqueous medium could be used;
- a stainless steel disc or shim, skid (4),
- a stainless steel lid (5) and a bottom (6) in stainless steel
- a stainless steel spring (7) and a polypropylene gasket, joint (8).

The stainless steel casing is then closed with a crimping machine, making it perfectly airproof. In order to check whether the batteries are operational, the latter are checked by measuring the floating voltage.

Because of the strong reactivity of lithium and of its salts to oxygen and water, the setting up of a button battery cell is carried out in a glove box. The latter is maintained under an anhydrous argon atmosphere, with slight overpressure. Sensors allow continuous monitoring of the oxygen and water concentration. Typically, these concentrations should remain less than one ppm.

The electrolyte prepared in the example and the electrolyte without any anionic surfactant, are mounted in button cells according to the procedure described above and undergo cycling operations, i.e.

charging and discharging operations at constant current under different operating conditions for 20 cycles in order to evaluate the practical capacity of the battery.

Once the button battery cell is made, it undergoes charging and discharging operations at constant current under different operating conditions for 20 cycles in order to evaluate the practical capacity of the battery.

A 5% increase in capacity was observed over the first cycles for the electrolyte with the anionic surfactant additive; moreover, there is less irreversible capacity in the first cycle, as compared with a system without any surfactant.

The invention claimed is:

1. A ionic liquid electrolyte comprising at least one ionic liquid of formula $C^+A^-$ wherein $C^+$ represents a cation and $A^-$ represents an anion, and at least one conducting salt, characterized in that it further comprises at least one anionic surfactant.

2. The electrolyte according to claim 1 wherein the anionic surfactant is selected from the group consisting of: alkyl and alkylaryl sulfates; soaps; alkylbenzene sulfonates (ABS); alcohol sulfates; alcohol alkyl sulfates; phosphates; cellulose gums; and mixtures thereof.

3. The electrolyte according to claim 2 which further comprises at least one other surfactant selected from cationic surfactants, non-ionic surfactants and zwitterionic surfactants.

4. The electrolyte according to claim 3 wherein the non-ionic surfactant is selected from (poly)ethoxylated and/or (poly)propoxylated alcohols and (especially $C_8$-$C_9$)alkyl phenols, polyol esters, saccharose esters, fatty alkanolamides, alkylene oxide/propylene oxide copolymers, and mixtures thereof.

5. The electrolyte according to claim 2 wherein said soaps are sodium salts of fatty acids.

6. The electrolyte according to claim 2 wherein the anionic surfactant is selected from alkyl sulfates, sodium carboxymethylcellulose, and sodium stearate.

7. The electrolyte according to claim 6 which further comprises at least one other surfactant selected from cationic surfactants, non-ionic surfactants and zwitterionic surfactants.

8. The electrolyte according to claim 7 wherein the non-ionic surfactant is selected from (poly)ethoxylated and/or (poly)propoxylated alcohols and (especially $C_8$-$C_9$)alkyl phenols, polyol esters, saccharose esters, fatty alkanolamides, alkylene oxide/propylene oxide copolymers, and mixtures thereof.

9. The electrolyte according to claim 6 wherein said alkyl sulfates is selected from the group consisting of sodium dodecylsulfate (SDS).

10. The electrolyte according to claim 2 wherein the cellulose gum is composed of sodium carboxymethylcellulose.

11. The electrolyte according to claim 1 which further comprises at least one other surfactant selected from cationic surfactants, non-ionic surfactants and zwitterionic surfactants.

12. The electrolyte according to claim 11 wherein the non-ionic surfactant is selected from (poly)ethoxylated and/or (poly)propoxylated alcohols and (especially $C_8$-$C_9$)alkyl phenols, polyol esters, saccharose esters, fatty alkanolamides, ethylene oxide/propylene oxide copolymers, and mixtures thereof.

13. The electrolyte according to claim 12 wherein the non-ionic surfactant is selected from the group consisting of: octylphenol ethoxylates, nonylphenol ethoxylates and ethylene oxide/propylene oxide copolymers.

14. The electrolyte according to claim 11 composed of one or more ionic liquid(s), one or more conducting salt(s), one or more anionic(s) surfactant(s) and one or more other surfactants.

15. The electrolyte according to claim 1, wherein the cation $C^+$ of the ionic liquid is selected from organic cations.

16. The electrolyte according to claim 15, wherein the cation $C^+$ of the ionic liquid is selected from hydroxonium, oxonium, ammonium, amidinium, phosphonium, uronium, thiouronium, guanidinium, sulfonium, phospholium, phosphorolium, iodonium, carbonium; and heterocyclic cations such as pyridinium, quinolinium, isoquinolinium, imidazolium, pyrazolium, imidazolinium, triazolium, pyridazinium, pyrimidinium, pyrrolidinium, thiazolium, oxazolium, pyrazinium, piperazinium, piperidinium, pyrrolium, pyrizinium, indolium, quinoxalinium, thiomorpholinium, morpholinium, and indolinium cations; and the tautomeric forms thereof.

17. The electrolyte according to claim 16 wherein the cation $C^+$ of the ionic liquid is selected from unsubstituted or substituted imidazoliums, quaternary ammoniums, unsubstituted or substituted piperidiniums, unsubstituted or substituted pyrrolidiniums, unsubstituted or substituted pyrazoliums, unsubstituted or substituted pyridiniums, phosphoniums, sulfoniums, and the tautomeric forms thereof.

18. The electrolyte according to claim 17, wherein the cation $C^+$ of the ionic liquid is selected from piperidiniums; quaternary ammoniums; imidazoliums and the tautomeric forms thereof.

19. The electrolyte according to claim 17 wherein said substituted imidazoliums is selected from the group consisting of-di-, tri-, tetra- and penta-alkyl imidazoliums.

20. The electrolyte according to claim 17 wherein said substituted piperidiniums are dialkylpiperidiniums.

21. The electrolyte according to claim 17 wherein said pyrrolidiniums are dialkylpyrrolidiniums.

22. The electrolyte according to claim 17 wherein said pyrazoliums are dialkylpyrazoliums.

23. The electrolyte according to claim 17 wherein said substituted pyridiniums are alkylpyridiniums.

24. The electrolyte according to claim 17 wherein said phosphoniums are tetraalkylphosphoniums.

25. The electrolyte according to claim 17 wherein said sulfoniums are trialkylsulfoniums.

26. The electrolyte according to claim 1 wherein the anion $A^-$ of the ionic liquid is selected from the group consisting of halide(s), $BF_4^-$, $B(CN)_4^-$, $CH_3BF_3^-$, $CH_2CHBF_3^-$, $CF_3BF_3^-$, $m\text{-}C_nF_{2n+1}BF_3^-$ wherein n is an integer such that $1 \leq n \leq 10$, $PF_6^-$, $CF_3CO_2$, $CF_3SO_3^-$, $N(SO_2CF_3)_2^-$, $N(COCF_3)(SOCF_3)^-$, $N(CN)_2^-$, $C(CN)_3^-$, $SCN^-$, $SeCN^-$, $CuCl_2^-$, and $AlCl_4$.

27. The electrolyte according to claim 26 wherein the anion $A^-$ of the ionic liquid is selected from the group consisting of $BF_4^-$ and TFSI which is-$(N(SO_2CF_3)_2)^-$.

28. The electrolyte according to claim 26 wherein said halide is $Cl^-$.

29. The electrolyte according to claim 1 wherein the ionic liquid comprises a cation $C^+$ selected from piperidiniums, quaternary ammoniums and imidazoliums, associated with an anion $A^-$ selected from $BF_4^-$ and TFSI which is-$(N(SO_2CF_3)_2^-)$.

30. The electrolyte according to claim 29 wherein the ionic liquid is $BMIBF_4$ which is 1-butyl-3-methylimidazolium tetrafluoroborate.

31. The electrolyte according to claim 1 wherein the at least one conducting salt is selected from lithium salts.

32. The electrolyte according to claim 31 wherein the conducting salt is selected from $LiPF_6$: lithium hexafluorophosphate, $LiBF_4$: lithium tetrafluoroborate, $LiAsF_6$: lithium hexafluoroarsenate, $LiClO_4$: lithium perchlorate, LiBOB: lithium bisoxalatoborate, LiFSI: lithium bis(fluorosulfonyl) imidide, salts of general formula $Li[N(SO_2C_nF_{2n+1})(SO_2C_mF_{2m+1})])$ wherein n and m either identical or different, are natural integers comprised between 1 and 10.

33. The electrolyte according to claim 32 wherein the conducting salt is selected from LiTFSI, $LiPF_6$, LiFSI, $LiBF_4$, and mixtures thereof.

34. The electrolyte according to claim 32 wherein the salts having the general formula $Li[N(SO_2C_nF_{2n+1})(SO_2C_mF_{2m+1})])$ wherein n and m are either identical or different natural integers of between 1 and 10 are selected from the class consisting of: LiTFSI: lithium bis(trifluoromethylsulfonyl)imidide or $LiN(CF_3SO_2)_2$, or LiBeti: lithium bis(perfluoroethylsulfonyl) imidide, LiODBF, LiB $(C_6H_5)$, $LiCF_3SO_3$, $LiC(CF_3SO_2)_3$ (LiTFSM), and mixtures thereof.

35. The electrolyte according to claim 1 which comprises from 0.001 to 0.5 moles of anionic surfactant per mole of ionic liquid solvent.

36. The electrolyte according to claim 1 which comprises from 0.1 to 10 mol/L of conducting salt.

37. The electrolyte according to claim 1 which further comprises at least one organic solvent.

38. The electrolyte according to claim 1 composed of one or more ionic liquid(s), the conducting salt(s), and one or more anionic surfactant(s).

39. The electrolyte according to claim 1 which comprises 1.6 mol/L of $LiPF_6$ in an equimolar mixture of ionic liquid solvent $BMIBF_4$ and SDS.

40. An electrochemical system comprising an electrolyte according to claim 1.

41. A rechargeable electrochemical accumulator or secondary electrochemical battery comprising an electrolyte according to claim 1, a positive electrode and a negative electrode.

42. The accumulator or battery according to claim 41 which is a button battery cell.

43. The electrolyte according to claim 18 wherein the imidazoliums are penta-substituted imidazoliums.

44. The electrolyte according to claim 43 wherein the penia-substituted imidazoliums are penta-alkylimidazoliums.

45. The rechargeable electrochemical accumulator or secondary electrochemical battery according to claim 41 which is a lithium accumulator or battery.

* * * * *